US009392474B2

(12) United States Patent
Devarasetty

(10) Patent No.: US 9,392,474 B2
(45) Date of Patent: Jul. 12, 2016

(54) METHODS, SYSTEMS, AND COMPUTER READABLE MEDIA FOR DETERMINING A METRIC OF RADIO FREQUENCY CHANNEL QUALITY FOR IDLE CHANNELS IN LTE AND LTE ADVANCED NETWORKS

(71) Applicant: Ixia, Calabasas, CA (US)

(72) Inventor: Prasada Rao Devarasetty, Cary, NC (US)

(73) Assignee: IXIA, Calabasas, CA (US)

( * ) Notice: Subject to any disclaimer, the term of this patent is extended or adjusted under 35 U.S.C. 154(b) by 20 days.

(21) Appl. No.: 14/326,028

(22) Filed: Jul. 8, 2014

(65) Prior Publication Data

US 2016/0014625 A1 Jan. 14, 2016

(51) Int. Cl.

| | |
|---|---|
| ***H04J 11/00*** | (2006.01) |
| ***H04W 4/00*** | (2009.01) |
| ***H04W 24/06*** | (2009.01) |
| ***H04L 5/00*** | (2006.01) |
| ***H04L 25/02*** | (2006.01) |

(52) U.S. Cl.

CPC ............. *H04W 24/06* (2013.01); *H04L 5/0048* (2013.01); *H04L 25/0228* (2013.01)

(58) Field of Classification Search

CPC ......... H04J 1/00; H04B 17/0042; H04B 3/46; H04B 17/00; H04L 12/26; H04W 36/00; H04W 36/30; H04W 36/20

USPC ......... 370/240, 241, 244, 329, 350, 503–509, 370/203–208, 343; 455/67.13, 67.11, 455/277.1, 277.2; 375/224, 295

See application file for complete search history.

(56) References Cited

U.S. PATENT DOCUMENTS

| | | | | |
|---|---|---|---|---|
| 5,675,344 | A | 10/1997 | Tong et al. | |
| 6,587,517 | B1 | 7/2003 | Li et al. | |
| 7,397,758 | B1 | 7/2008 | Hart et al. | |
| 8,169,993 | B2 * | 5/2012 | Huang | H04B 17/309 370/343 |
| 8,223,825 | B2 * | 7/2012 | Lindoff | H04B 17/336 375/224 |
| 8,798,124 | B2 * | 8/2014 | Lee | H04B 17/21 324/76.11 |
| 8,862,084 | B2 * | 10/2014 | Carlsson | H04B 17/0042 455/226.1 |
| 2004/0085917 | A1 | 5/2004 | Fitton et al. | |
| 2008/0212659 | A1 | 9/2008 | Usui | |
| 2008/0240265 | A1 | 10/2008 | Fechtel | |
| 2010/0271932 | A1 | 10/2010 | Hwang et al. | |

(Continued)

FOREIGN PATENT DOCUMENTS

| | | | |
|---|---|---|---|
| WO | WO-2005/055543 | A1 | 6/2005 |
| WO | WO 2015/069478 | A1 | 5/2015 |

OTHER PUBLICATIONS

"Error Vector Magnitude," http://en.wikipedia.org/wiki/Error_vector_magnitude, pp. 1-3 (Apr. 18, 2014).

(Continued)

*Primary Examiner* — Hanh N Nguyen

(74) *Attorney, Agent, or Firm* — Jenkins, Wilson, Taylor & Hunt, P.A.

(57) ABSTRACT

Methods, systems, and computer readable media for determining a metric of radio frequency channel quality for idle channels are disclosed. One method includes receiving a plurality of reference symbols transmitted by a transmitter for an idle channel state when user data and control channel data are not transmitted over the radio frequency channel. The method further includes computing a metric of channel quality using at least one of the reference symbols.

21 Claims, 6 Drawing Sheets

200
208
204
206
Frequency
202
Time
202
First slot
Second slot
Reference symbol
204
206
208

(56) References Cited

U.S. PATENT DOCUMENTS

| | | | |
|---|---|---|---|
| 2011/0261675 | A1 | 10/2011 | Lee et al. |
| 2011/0280296 | A1 | 11/2011 | Wang et al. |
| 2012/0201320 | A1 | 8/2012 | Koike-Akino |
| 2012/0300680 | A1 | 11/2012 | Pietsch et al. |
| 2012/0320961 | A1 | 12/2012 | Pham et al. |
| 2015/0124911 | A1 | 5/2015 | Wicker, Jr. et al. |
| 2015/0372842 | A1 | 12/2015 | Wicker, Jr. et al. |

OTHER PUBLICATIONS

"3GPP Long Term Evolution (LTE): Primary and Secondary Synchronization Signals (PSS & SSS) in LTE," Adnan Basir, http://4g-lte-world.blogspot.com/2012/06/primary-and-secondary-synchronization.html, pp. 1-5 (Jun. 7, 2012).

Dahlman et al. "4G LTE/LTE-Advanced for Mobile Broadband," pp. 27-44, 143-202, & 301-321 (2011).

"Design How-To: An Overview of the LTE physical layer—Part II," Frank Rayal, Telesystem Innovations. EE Times, http://www.eetimes.com/document.asp?doc_id=1278137, pp. 1-4 (Jun. 20, 2010).

"EVM Calculation for Broadband Modulated Signals," McKinley et al., 64th ARFTG Conf. Dig., Orlando, FL, pp. 45-52 (Dec. 2004).

Ex parte Quayle Office Action for U.S. Appl. No. 14/520,261 (Mar. 10, 2015).

Notification of Transmittal of the International Search Report and the Written Opinion of the International Searching Authority, or the Declaration for PCT International Application No. PCT/US2014/062393 (Jan. 26, 2015).

Commonly-assigned, co-pending U.S. Appl. No. 14/520,261 for "Systems and Methods for Improved Wireless Channel Estimation," (Unpublished, filed Oct. 21, 2014).

Commonly-assigned, co-pending U.S. Appl. No. 14/308,680 for "Systems and Methods for Improved Wireless Channel Estimation," (Unpublished, filed Jun. 18, 2014).

Notice of Allowance and Fee(s) Due for U.S. Appl. No. 14/520,261 (Dec. 21, 2015).

Applicant-Initiated Interview Summary for U.S. Appl. No. 14/520,261 (Nov. 24, 2015).

Notice of Allowance and Fee(s) Due and Examiner-Initiated Interview Summary for U.S. Appl. No. 14/308,680 (Oct. 15, 2015).

Non-Final Office Action for U.S. Appl. No. 14/520,261 (Jun. 9, 2015).

Non-Final Office Action for U.S. Appl. No. 14/308,680 (May 28, 2015).

* cited by examiner

METHODS, SYSTEMS, AND COMPUTER READABLE MEDIA FOR DETERMINING A METRIC OF RADIO FREQUENCY CHANNEL QUALITY FOR IDLE CHANNELS IN LTE AND LTE ADVANCED NETWORKS

TECHNICAL FIELD

The subject matter described herein relates to quantifying radio frequency channel quality. More particularly, the subject matter described herein relates to methods, systems, and computer readable media for determining a metric of radio frequency channel quality for idle channel states in LTE, LTE advanced, or other generation networks in which idle channel states occur.

BACKGROUND

When operating radio network equipment, such as evolved nodeB (eNodeB), it is desirable to calculate a metric of the channel quality so that channel errors due to noise, modulation errors, etc., can be quantified. One typical metric of channel quality is the error vector magnitude (EVM). The error vector magnitude is a ratio of the power of an error vector from a received signal to an ideal signal and the power of the ideal signal. Noise, distortion, spurious signals, and phase noise all degrade the EVM, and thus the EVM provides a comprehensive measure of the quality of the radio receiver or transmitter for use in digital communications.

The EVM is typically calculated during transmission of user data. In order to calculate the EVM, a signal is received and demodulated. The demodulated signal will correspond to a constellation point in the IQ plane. The error vector is the vector from the ideal constellation point to the actually received constellation point. The vector magnitude can then be computed from the ratio of the power of the error vector to the power of the ideal constellation point.

Because conventional error vector magnitude calculation relies on user data, conventional EVM calculation requires user equipment (UEs) to be communicating user data with the eNodeB. However, it may be desirable to determine an indication of the error vector magnitude prior to the transmission of user data so that the health of the eNodeB can be assessed before the eNodeB is ready or capable of transmitting user data or synchronization data. Conventional EVM calculation that relies upon user data is unable to perform such a pre-user communication health check of the eNodeB.

Accordingly, in light of these difficulties, there exists a need for methods, systems, and computer readable media for determining a metric of radio frequency channel quality in terms of error for idle channels.

SUMMARY

Methods, systems, and computer readable media for determining a metric of radio frequency channel quality for idle channels are disclosed. One method includes receiving a plurality of reference symbols transmitted by a transmitter for an idle channel state when user data and control channel data are not transmitted over the radio frequency channel. The method further includes computing a metric of channel quality using at least one of the reference symbols.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for determining a metric of radio frequency channel error for idle channels. The subject matter described herein may utilize reference symbols or synchronization symbols that are transmitted for an idle channel, i.e., a channel state when user data and control channel data are not being transmitted over a radio link, to compute error vector magnitude. Reference symbols are conventionally used for channel estimation, which is used to determine the transfer function of the channel to correct and track the channel. Synchronization symbols are conventionally used for cell identification which may not present from eNodeB when no data activity. By using reference symbols to determine EVM over time can be quantified even when user data, control channel data, and synchronization are not present.

Figure 1:
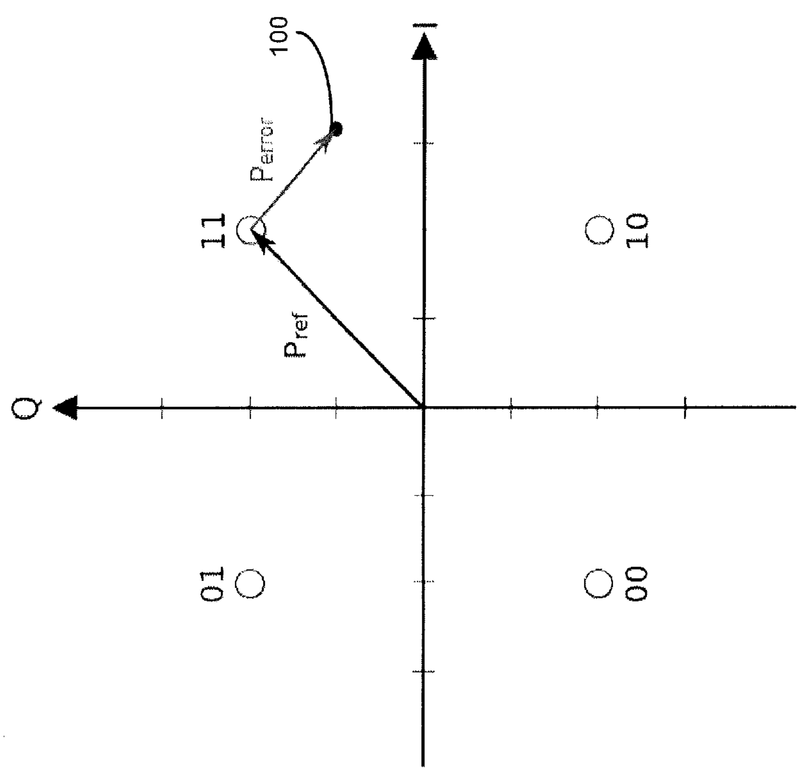
FIG. 1 is a signal constellation diagram illustrating computation of error vector magnitude according to an embodiment of the subject matter described herein.

As stated above, one exemplary well known metric of channel quality is the EVM. FIG. 1 is a signal constellation diagram illustrating the calculation of the EVM. In FIG. 1, the horizontal axis represents the real or I component of a received signal, and the vertical axis represents the imaginary or Q component of a received signal. The points in the centers of each quadrant are referred to as ideal signal constellation points. In the illustrated example, four points are shown, each of which encodes 2 bits of data. The signal constellation shown is for quadrature amplitude modulation (QAM). Additional constellation points can be included to encode more data. For example, in 16QAM modulation, four constellation points are present in each quadrant, and each constellation point encodes four bits of data.

In the illustrated example, the point in the first quadrant labeled 100 represents an actual received signal. The vector labeled $P_{error}$ is the error vector. The error vector magnitude is the ratio of the root an square (RMS) power of the error vector and the RMS power of the reference symbol. Thus, the error vector magnitude can be calculated as follows:

$$EVM(\text{dB}) = 10\log_{10}\left(\frac{P_{error}}{P_{reference}}\right) = 10\log_{10}\sqrt{\frac{(I_{error}-I_{ideal})^2+(Q_{error}-Q_{ideal})^2}{I_{ideal}^2+Q_{ideal}^2}} \quad (1)$$

Where $I_{ideal}$ and $Q_{ideal}$ are the magnitudes of the ideal signal vector on the I and Q axes and $I_{error}$ and $Q_{error}$ are the magnitudes of the error vector along the I and Q axes. As stated above, the error vector magnitude has conventionally been calculated using user data. According to an aspect of the subject matter described herein, the error vector magnitude can be calculated using downlink reference symbols.

Figure 2:
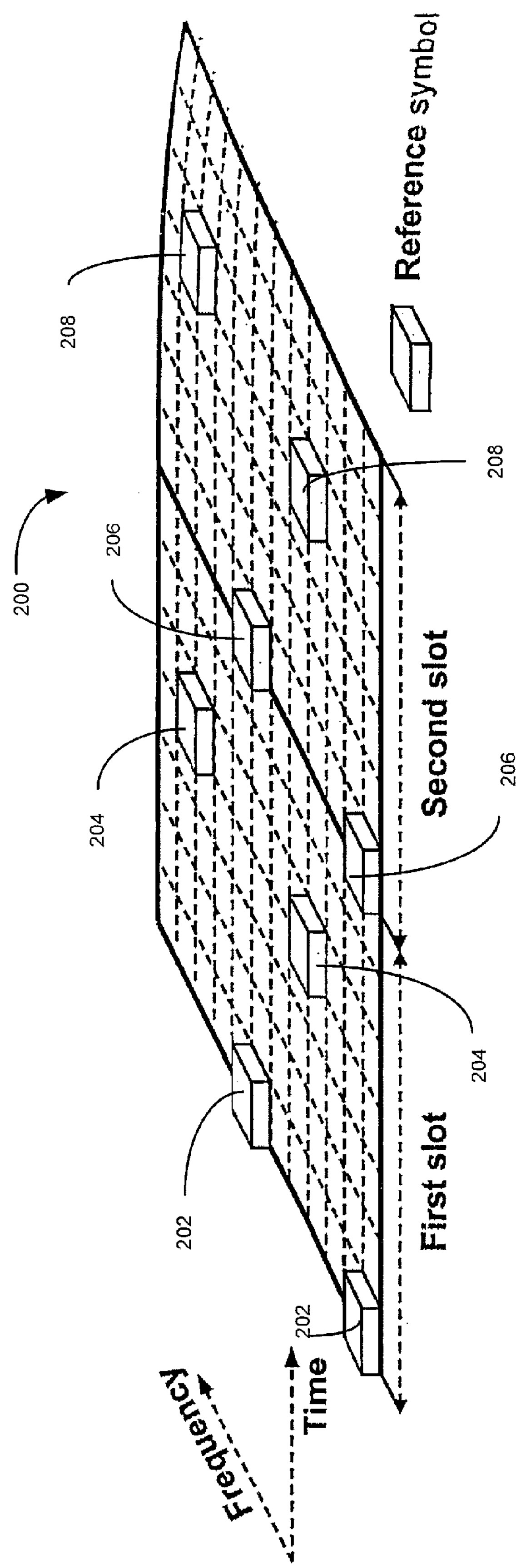
FIG. 2 is a diagram illustrating downlink reference symbols for a single downlink reference signal that may be used for EVM calculation according to an embodiment of the subject matter described herein.

FIG. 2 is a diagram illustrating an exemplary LTE or LTE advanced downlink resource grid and downlink reference symbols that may be used for determining the error vector magnitude according to an embodiment of the subject matter described herein. Referring to FIG. 2, resource grid 200 is divided into the frequency domain along the vertical axis and the time domain along the horizontal axis. Each block in the grid corresponds to a resource element. In FIG. 2, resource grid 200 corresponds to a one 1 millisecond subframe. In a one 1 millisecond subframe, a single cell specific reference signal includes eight reference symbols. The reference symbols are transmitted in the first and third from last orthogonal frequency division multiplexing (OFDM) time slot in each half millisecond portion of a 1 millisecond subframe.

In order to calculate the EVM using a reference symbol, the reference symbol may be received and demodulated. Returning to FIG. 1, point 100 may correspond to a demodulated reference symbol. Once the symbol is demodulated, the magnitude of $P_{error}$ can be calculated or determined and the error vector magnitude can be calculated using Equation 1 above.

According to an aspect of the subject matter described herein, reference symbols may alternatingly be used for channel estimation and error vector magnitude calculation. For example, in FIG. 2, reference symbols 202 occurring in the first OFDM timeslot may only be used for channel estimation. Reference symbols 204 in the third from last OFDM timeslot may only be used for EVM calculation. Reference symbols 206 may be used for channel estimation. Reference symbols 208 may be used for EVM calculation.

Figure 3:
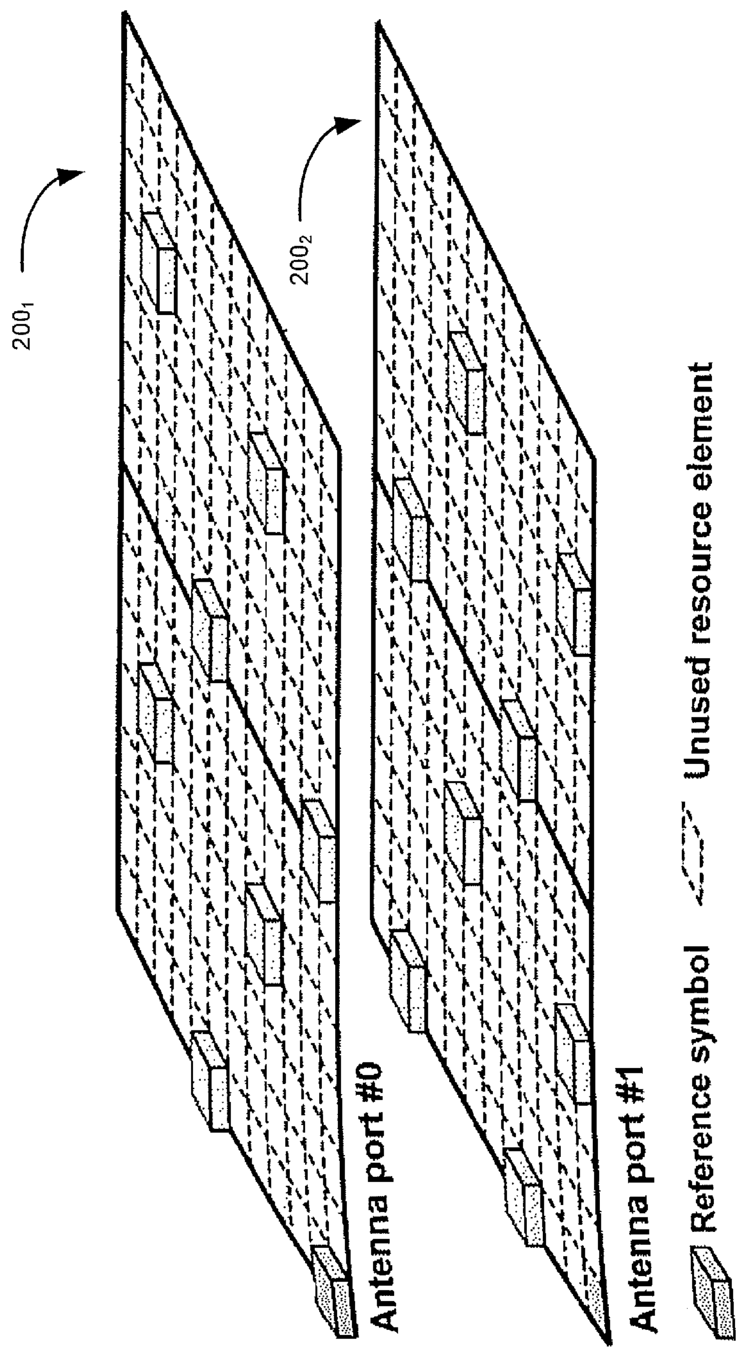
FIG. 3 is a diagram illustrating downlink reference symbols for different antenna ports that may be used for EVM calculation according to an embodiment of the subject matter described herein.

In LTE networks, reference signals are transmitted on a per antenna port basis. Thus, EVM calculation using reference signals may be performed on a per antenna port basis. FIG. 3 illustrates an example of two reference signals that may be transmitted for two different antenna ports. Referring to FIG. 3, grid $\mathbf{200}_1$ includes a reference signal transmitted for antenna port 0 and grid $\mathbf{200}_2$ represents a reference signal that may be transmitted for antenna port 1. As with the example illustrated in FIG. 2, EVM calculation and channel estimation may be performed on an alternating basis for the reference symbols for each antenna port. Thus, the subject matter described herein may include performing EVM calculation and channel estimation on a per antenna port basis for reference symbols specific to each antenna port.

The subject matter described herein is not limited to using the same reference symbols in each downlink subframe to perform EVM calculation and channel estimation. The reference symbols that are used for EVM calculation and channel estimation may be varied between subframes. For example, returning to FIG. 2, if reference symbols 202 are used for channel estimation and reference symbols 204 are used for EVM calculation during a first subframe, during the next subframe, reference symbols 202 may be used for EVM calculation and reference symbols 204 may be used for channel estimation. Thus, the reference symbols that are used for EVM calculation and channel estimation may be varied in both time and frequency between subframes.

Figure 4:
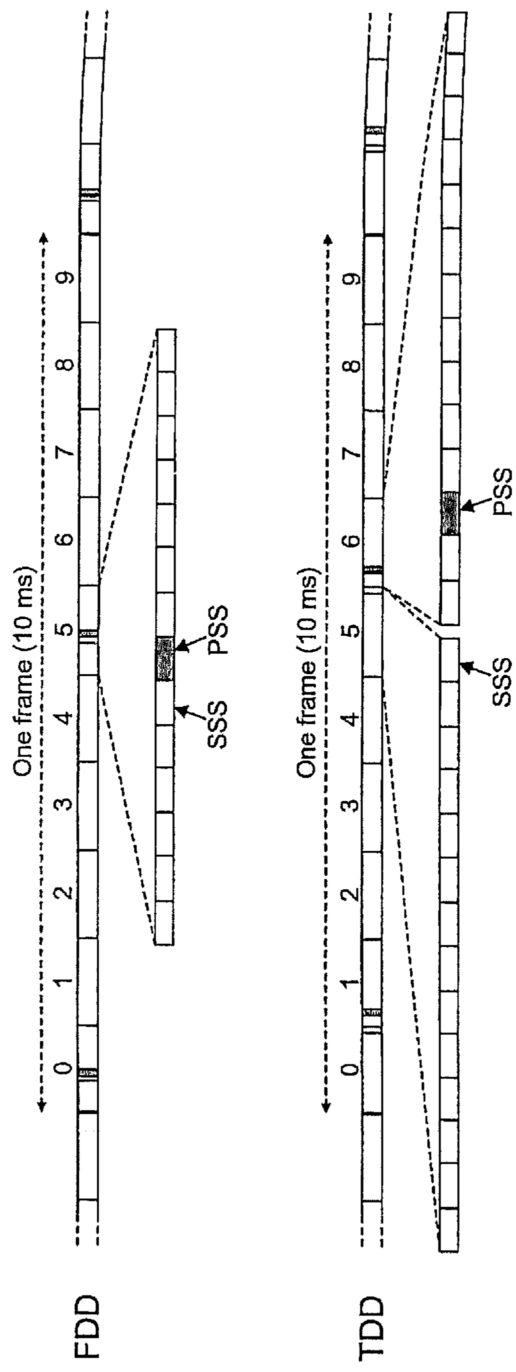
FIG. 4 is a diagram illustrating primary synchronization signals (PSS) and second synchronization signals (SSS) that may be used for EVM calculation according to an embodiment of the subject matter described herein.

The subject matter described herein is not limited to using reference symbols to calculate the EVM. In an alternate implementation, synchronization symbols that are components of either a primary synchronization signal (PSS) or a secondary synchronization signal (SSS) may be used in addition to reference symbols though synchronization symbols are concentrated at a certain sub carrier frequencies. The PSS and the SSS are used by user elements to identify the cell to which the UE is attached. FIG. 4 illustrates exemplary locations for the PSS and SSS signals. The location of the PSS and SSS signals is different depending on whether frequency division duplex (FDD) or time division duplex (TDD) is used in the cell. In either case, the PSS or the SSS may be detected and, in addition to being used to identify the cell, the symbols that make up the PSS or the SSS may be used for EVM calculation. Using only synchronization symbols in computing EVM will not result in good EVM estimate across the whole bandwidth as PSS and SSS are fixed and localized to few limited frequency sub carriers.

The EVM can be calculated using a PSS or SSS symbol using the same method described above for a reference symbol. For example, referring to FIG. 1, a PSS symbol may be received and demodulated. In this example, suppose the PSS symbol falls in the fourth quadrant. The error vector from the received demodulated constellation point to the 10 constellation point could be identified and its power could be determined or calculated. The EVM could then be determined using Equation 1 above.

Figure 5:
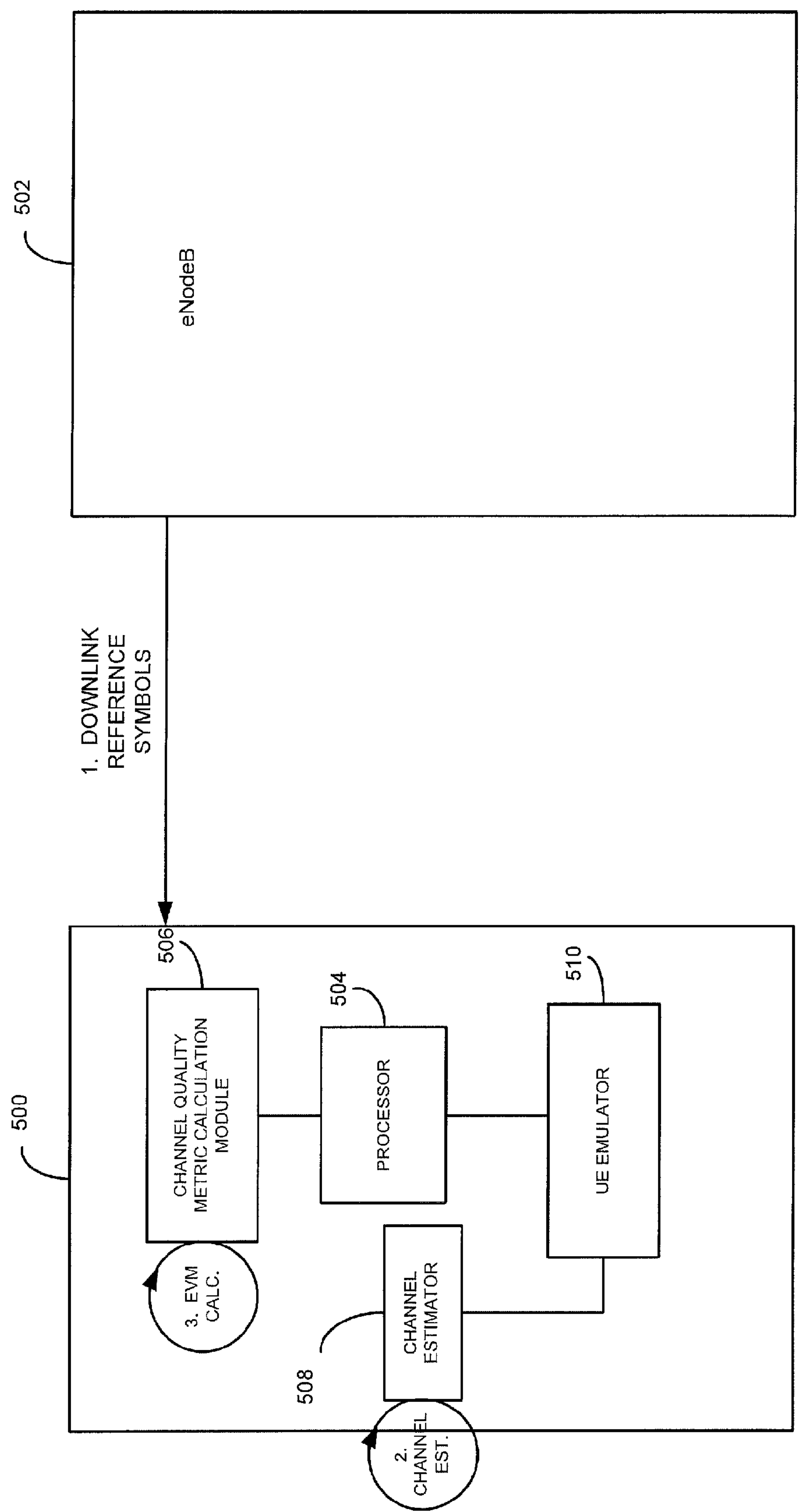
FIG. 5 is a block diagram illustrating an exemplary network equipment test device that computes error vector magnitude for an idle channel state according to an embodiment of the subject matter described herein.

FIG. 5 is a block diagram illustrating an exemplary system for calculating channel quality metrics based on downlink reference symbols alone or in combination with synchronization symbols according to an embodiment of the subject matter described herein. Referring to FIG. 5, a network equipment test device 500 may be configured to test a network device, such as an eNodeB 502. Network equipment test device 500 includes at least one processor 504 that includes at least some hardware. Network equipment test device 500 also includes a channel quality metric calculation module 506 that calculates metrics of channel quality, such as the EVM, based on downlink reference symbols or synchronization symbols received from eNodeB 502. Network equipment test device 500 also includes a channel estimator 508 that performs channel estimation based on at least some of the reference symbols received from eNodeB 502. Network equipment test device 500 may also include a UE emulator 510 that emulates UEs to test the functionality and/or performance of eNodeB 502.

In operation, for an idle channel state that occurs during eNodeB equipment development or if eNodeB has issues with data or control channels, eNodeB 502 may transmit downlink reference and may be synchronization symbols (but not user or control channel data) to network equipment test device 500. Channel estimator 508 may perform channel estimation using some of the reference symbols. Channel estimation involves determining the complex conjugate of the transfer function H of a channel. For example, if the channel has a complex frequency domain transfer function of H, channel estimation involves determining the complex conjugate of H or H* to nullify the effect of the transfer function of the channel on the transmitted signals. Channel estimation needs to be performed periodically because the characteristics of the channel change over time. In addition, channel estimation is preferably performed at different frequencies so that the channel estimate will be accurate enough across the bandwidth.

Channel estimation may be performed using any suitable channel estimation algorithm, such as simple averaging in combination with linear interpolation or minimum mean square error estimation. Channel estimation has the effect of making the channel error zero for the particular signal that is transmitted. For example, returning to FIG. 1, if channel estimation is performed for demodulated signal constellation point 100 that is received, the signal constellation would be reset so that demodulated signal constellation point 100 is exactly at the location of the bits 11 in the first quadrant, making the magnitude of the error vector after channel estimation zero.

After the channel has been estimated, channel quality metric calculation module 506 may perform EVM calculation using subsequent downlink reference and synchronization symbols if available. In this example, it is assumed that downlink reference symbols are used to perform EVM calculation. Assuming that a first reference symbol in a subframe is used for channel estimation, the second reference symbol may be used for EVM calculation. EVM calculation may be performed by receiving and demodulating a symbol, determining the power of the error vector, and calculating the EVM using Equation 1 above. EVM and channel estimation will never happen together on the same reference symbol.

According to an aspect of the subject matter described herein, the EVM may be used to determine whether eNodeB 502 is suitable for further operation. For example, the EVM may be calculated for several reference symbols and then averaged. If the average EVM is less than a threshold value, testing of eNodeB 502 may be permitted to continue. Alternatively, if the EVM is greater than the threshold, an alarm may be generated indicating an unacceptable level of channel error and testing may cease. Assuming that testing is allowed to continue, UE emulator 510 may emulate plural UEs that attach to and send data to the eNodeB 502 to test the functionality and/or performance of eNodeB 502. Emulating UEs may include attaching the UEs to eNodeB 502, receiving downlink control information (DCI) from eNodeB 502, identifying which time slots to transmit in on the uplink channel, and transmitting data to eNodeB 502 on the uplink channel. Thus, UE emulator 510 may decode downlink signals to identify resource element allocations and use those allocations to communicate with eNodeB 502. Stress testing eNodeB 502 may include emulating a large number of UEs that simultaneously communicate with eNodeB 502.

Figure 6:
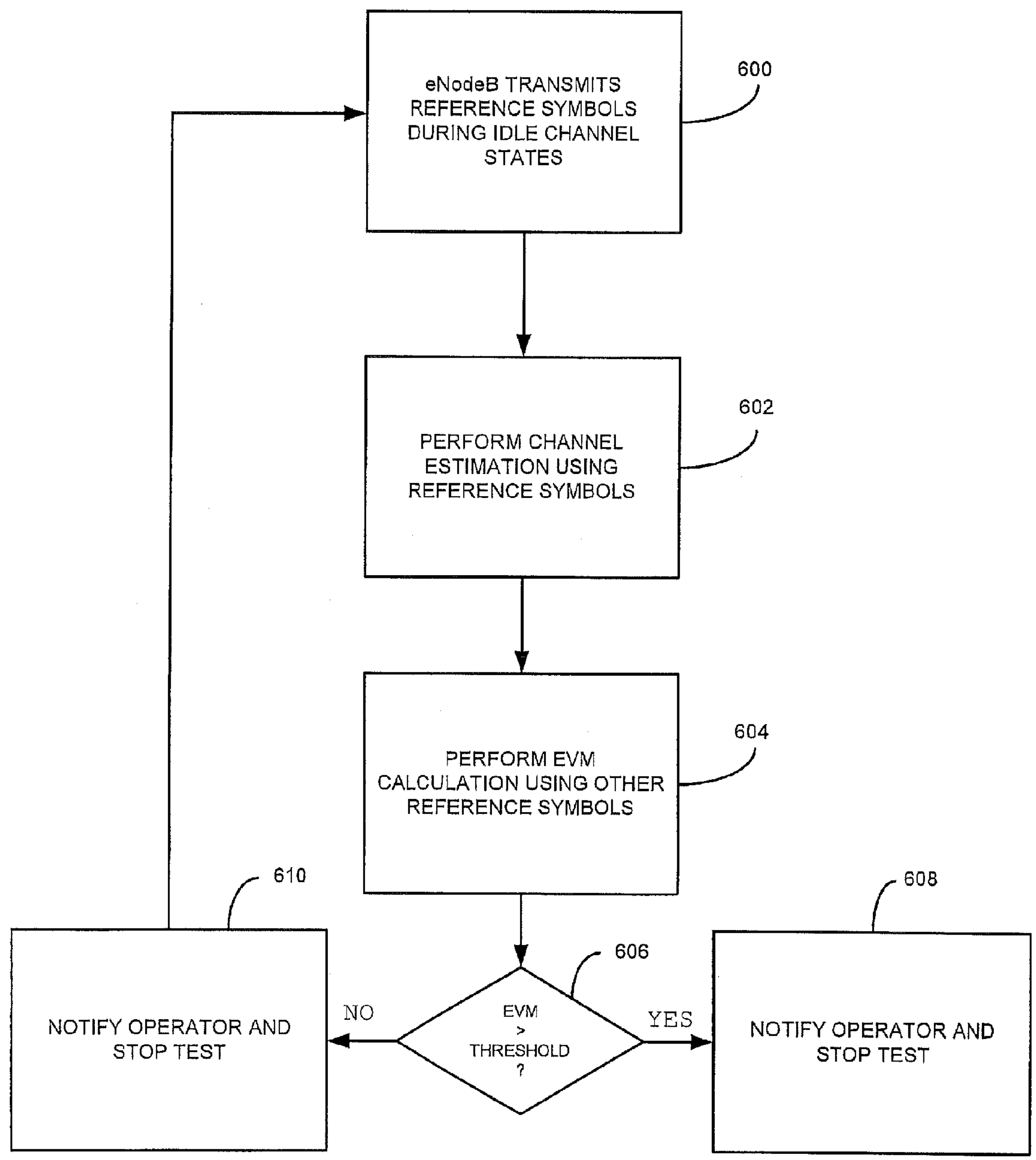
FIG. 6 is a flow chart illustrating an exemplary process for computing and using the error vector magnitude for an idle channel according to an embodiment of the subject matter described herein.

FIG. 6 is a flow chart illustrating an exemplary process for testing a radio network device where EVM calculation is performed using downlink reference symbols according to an embodiment of the subject matter described herein. Referring to FIG. 6, in step 600, the eNodeB transmits reference symbols to the network equipment test device for an idle channel state. In step 602, channel estimation is performed using at least some and not all of the reference symbols. In step 604, EVM calculation is performed using other reference symbols. As stated above, EVM calculation and channel estimation can be performed alternatingly for reference symbols that make up a reference signal and the alternation may be varied between subframes. In one example, a group of N successive reference symbols may be used for channel estimation followed by a group of N successive reference symbols which are used for EVM calculation. N may be any integer value. In another example, every $N^{th}$ reference symbol may be used for channel estimation and every $(N+1)^{th}$ reference symbol may be used for EVM calculation.

In step 606, it is determined that whether the EVM is greater than a threshold. For example, for QAM, the threshold may be set to 12%. To calculate the EVM as a percentage, a formula slightly different than Equation 1 can be used. Equation 2 shown below sets forth the formula for calculating the EVM as a percentage. The definitions in Equation 2 are the same as those in Equation 1.

$$EVM(\%) = \sqrt{\frac{P_{error}}{P_{reference}}} \times 100\% \tag{2}$$

If the EVM is greater than the threshold, control may proceed to step 608 where an alarm or other indication of the EVM is communicated to the user and the test is stopped. If the EVM is not greater than the threshold, control proceeds to step 610 where the test is continued. Continuing the test may include emulating UEs and transmitting data to the device under test. Control then returns to step 600-606 where the EVM is continually calculated and channel estimation is continually performed.

Although the subject matter described herein has been for calculating the EVM as illustrated with regard to a test environment, the subject matter described herein is not limited to a test environment. For example, EVM calculation using downlink reference symbols or synchronization symbols may also be performed by a UE to evaluate the quality of a channel before communicating with an eNodeB. If channel quality is less than a threshold, the UE may decide to connect to a different eNodeB. The subject matter described herein for computing a metric of channel quality for idle channels may improve both live networks and the testing of network equipment by making channel quality metrics available in the absence of user data or control channel data. It should also be noted that a receiver that implements the subject matter described herein may be a component of a special purpose computing device, such as a network equipment test device or an eNode B.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining a metric of radio frequency channel quality for idle channels, the method comprising:

at a receiver:

receiving a plurality of reference symbols transmitted by a transmitter for an idle channel state when user data and control channel data are not being transmitted by the transmitter;

using a first set of the reference symbols for channel estimation;

computing a metric of channel quality in the radio frequency channel using a second set of reference symbols different from the first set of reference symbols; and alternatinqly, between subframes of the radio frequency channel, using the first and second sets of reference symbols for channel estimation and for computing the metric of channel quality.

2. The method of claim 1 wherein the reference symbols include long term evolution (LTE) or LTE advanced downlink reference symbols transmitted by the transmitter usable by the receiver for channel estimation.

3. The method of claim 1 wherein the reference symbols are spaced in time and frequency from each other and wherein computing the metric of channel quality includes repeatedly computing the metric using reference symbols transmitted at different times and on different frequencies.

4. The method of claim 3 wherein computing the metric of channel quality includes computing an average of the metrics computed for different reference symbols.

5. The method of claim 1 wherein the metric of channel quality includes an error vector magnitude (EVM).

6. The method of claim 5 comprising computing the error vector magnitude for a plurality of reference symbols and computing an average error vector magnitude.

7. The method of claim 6 comprising determining whether the average error vector magnitude exceeds a threshold and, in response to determining that the average error vector magnitude exceeds a threshold, generating an indication of the error.

8. The method of claim 5 comprising computing the error vector magnitude for a plurality of reference symbols and determining an indication of how the error vector magnitude changes over time.

9. The method of claim 1 wherein the receiver comprises a network equipment test device and wherein the transmitter comprises an evolved nodeB (eNodeB).

10. The method of claim 1 wherein computing a metric of channel quality in the radio frequency channel using at least one of the reference symbols includes computing the metric of channel quality using at least one of the reference symbols in combination with at least one synchronization symbol.

11. A system for determining a metric of radio frequency channel quality for an idle channel state, the system comprising:

a receiver including at least one processor for receiving a plurality of reference symbols transmitted by a transmitter for an idle channel state when user data and control channel data are not being transmitted by the transmitter;

a channel quality metric calculation module operatively associated with the receiver for computing a metric of channel quality in the radio frequency channel using at least one of the reference symbols; and a channel estimation module for using a first set of the reference symbols for channel estimation, wherein the channel quality metric calculation module is configured to use a second set of reference symbols different from the first set for calculating the metric of channel quality, and wherein the channel estimation module and the channel quality metric calculation module are configured to alternatively, between subframes of the radio frequency channel, use the first and second sets of reference symbols for channel estimation and for calculating the metric of channel quality.

12. The system of claim 11 wherein the reference symbols include long term evolution (LTE) or LTE advanced downlink reference symbols transmitted by the transmitter usable by the receiver for channel estimation.

13. The system of claim 12 wherein the channel quality metric calculation module is configured to computer the metric of channel quality using at least one of the reference symbols in combination with at least one synchronization symbol.

14. The system of claim 12 wherein the receiver comprises a network equipment test device and wherein the transmitter comprises an evolved Node B.

15. The system of claim 11 wherein the reference symbols are spaced in time and frequency from each other and wherein the channel quality metric calculation module is configured to repeatedly compute the metric of channel quality using reference symbols transmitted at different times and on different frequencies.

16. The system of claim 15 wherein the channel quality metric calculation module is configured to compute an average of the metrics computed for different reference symbols.

17. The system of claim 11 wherein the metric of channel quality includes an error vector magnitude (EVM).

18. The system of claim 17 wherein the channel quality metric calculation module is configured to compute the error vector magnitude for a plurality of reference symbols and to compute an average error vector magnitude.

19. The system of claim 17 wherein the channel quality metric calculation module is configured to determine whether the average error vector magnitude exceeds a threshold and, in response to determining that the average error vector magnitude exceeds a threshold, to generate an indication of the error.

20. The system of claim 17 wherein the channel quality metric calculation module is configured to compute the error vector magnitude for a plurality of reference symbols and determine an indication of how the error vector magnitude changes over time.

21. A non-transitory computer readable having stored thereon executable instructions that when executed by the processor of a computer control the computer to perform steps comprising:

at a receiver:

receiving a plurality of reference symbols transmitted by a transmitter for an idle channel state when user data and control channel data are not being transmitted by the transmitter;

using a first set of the reference symbols for channel estimation;

computing a metric of channel quality in the radio frequency channel using a second set of reference symbols different from the first set of reference symbols; and alternatingly, between subframes of the radio frequency channel, using the first and second sets of reference symbols for channel estimation and for computing the metric of channel quality.

* * * * *